(12) United States Patent
Ogasawara et al.

(10) Patent No.: US 7,599,514 B2
(45) Date of Patent: Oct. 6, 2009

(54) OPTICAL INFORMATION READING DEVICE

(75) Inventors: Yasuhiro Ogasawara, Ashigarakami-gun (JP); Kazuhiro Hayashi, Ashigarakami-gun (JP); Katsunori Kawano, Ashigarakami-gun (JP); Jiro Minabe, Ashigarakami-gun (JP); Shin Yasuda, Ashigarakami-gun (JP); Hisae Yoshizawa, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 809 days.

(21) Appl. No.: 10/939,514

(22) Filed: Sep. 14, 2004

(65) Prior Publication Data
US 2005/0207312 A1    Sep. 22, 2005

(30) Foreign Application Priority Data
Mar. 22, 2004 (JP) .............................. 2004-082909

(51) Int. Cl.
*G06K 9/00* (2006.01)
*G01B 9/021* (2006.01)
*G03H 1/00* (2006.01)
*G02B 5/32* (2006.01)

(52) U.S. Cl. ........................... 382/100; 356/457; 359/2; 359/15

(58) Field of Classification Search ........................ None
See application file for complete search history.

(56) References Cited

U.S. PATENT DOCUMENTS

| | | | | |
|---|---|---|---|---|
| 5,144,461 A * | 9/1992 | Horan | ........................ | 359/30 |
| 5,596,402 A * | 1/1997 | Markantes et al. | ............ | 356/71 |
| 6,104,466 A * | 8/2000 | Buchwalter et al. | ......... | 349/187 |
| 6,795,173 B2 * | 9/2004 | Romano et al. | ............... | 356/71 |
| 7,103,201 B2 * | 9/2006 | Scott et al. | ................... | 382/124 |
| 2002/0191175 A1 * | 12/2002 | Coombs et al. | ............... | 356/71 |

FOREIGN PATENT DOCUMENTS

| | | |
|---|---|---|
| JP | A-08-241363 | 9/1996 |
| JP | A-11-282951 | 10/1999 |
| JP | A-11-312210 | 11/1999 |
| JP | 2000-194794 | * 7/2000 |
| JP | A 2000-194794 | 7/2000 |
| JP | 2000-268147 | * 9/2000 |
| JP | 2001-118123 | * 4/2001 |
| JP | 2002-196654 | * 7/2002 |

(Continued)

*Primary Examiner*—Brian P Werner
*Assistant Examiner*—Jayesh Patel
(74) *Attorney, Agent, or Firm*—Oliff & Berridge, PLC (57) ABSTRACT

The present invention provides an optical information reading device includes: a light source that irradiates, with reference beam, a hologram recorded in an optical recording medium; a reading unit that reads information from a holographic image reconstructed by the reference beam being diffracted by the hologram; a housing; a contact member of the housing contacting a paper; an open portion formed in the contact member, through which the optical recording medium is exposed and towards which the reference beam is emitted; an alignment mark formed at a periphery of the open portion, the reference beam irradiating the hologram satisfying a holographic image reconstruction condition by the alignment mark being aligned with an optical recording medium alignment mark recorded on the optical recording medium; and a viewing portion that is positioned in the housing and through which the alignment mark and the optical recording medium alignment mark are visible.

14 Claims, 9 Drawing Sheets

FOREIGN PATENT DOCUMENTS

| JP | 2002-230476 | * | 8/2002 |
| JP | A-2002-230476 | | 8/2002 |
| JP | 2002-333817 | * | 11/2002 |
| JP | A-2002-333817 | | 11/2002 |
| JP | 2003-162207 | * | 6/2003 |
| JP | A-2003-162207 | | 6/2003 |

* cited by examiner

RELATED ART

FIG. 9B

RELATED ART

OPTICAL INFORMATION READING DEVICE

CROSS-REFERENCE TO RELATED APPLICATION

This application claims priority under 35 USC 119 from Japanese Patent Application No. 2004-082909 the disclosures of which are incorporated by reference herein.

BACKGROUND OF THE INVENTION

1. Field of the Invention

The present invention relates to an optical information reading device that reads information recorded in a recording medium by a hologram or the like.

2. Description of the Related Art

With prepaid cards, credit cards, debit cards and identification cards, it is necessary to determine whether or not the cards have been illegally forged or altered. As one method of determining this, a hologram is recorded on a credit card or bank card, and the hologram is read. With respect to gift cards also, holograms where characters, numbers or pictures change depending on the angle at which the card is viewed are disposed as a measure to prevent forgery. These holograms are promising as large-capacity, high-speed transferable recording media.

Figure 9A:
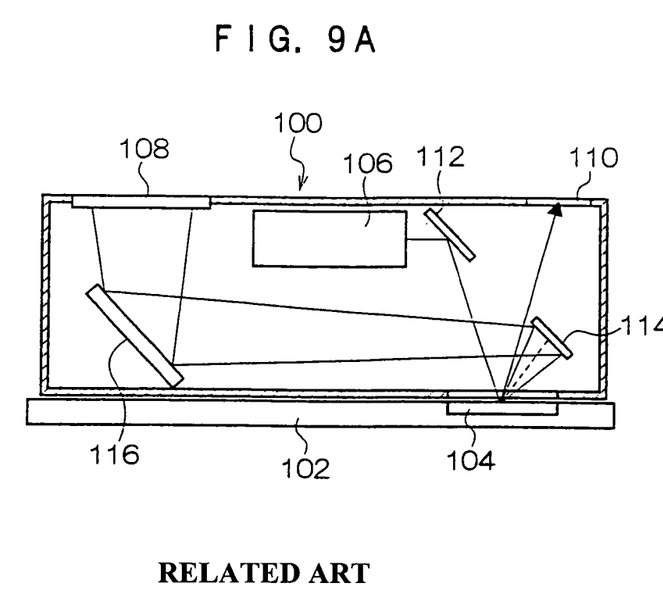
FIGS. 9(A) and 9(B) are explanatory views of conventional optical reading devices.

For example, as shown in FIG. 9(A), a reading device 100 has been disclosed which reads a hologram 104 recorded in a card 102. The reading device 100 is placed on the card 102 and the hologram 104 is irradiated with reference beam (e.g., see Japanese Patent Application Laid-Open Publication No. 2000-194794; hereinafter, "Patent Document 1").

This reading device 100 is disposed with a light source 106 that emits reference beam. The reference beam is emitted from the light source 106 towards the hologram 104 and diffracted by the hologram 104, whereby a holographic image formed thereby is displayed on a screen 108 and read. The reading device 100 is disposed with a diffusion member 110 at a position where light reflected by the hologram 104 is made incident when the hologram 104 is in a readable position with respect to the reading device 100. By adjusting the position of the reading device 100 so that the diffusion member 110 becomes bright, the holographic image recorded on the card 102 is displayed on the screen 108.

However, in this reading device 100, an image optics (mirrors 112, 114 and 116) for separating the light reflected by the hologram 104 and the holographic image formed by the light being diffracted by the hologram 104 become necessary, which leads to an increase in the number of parts.

Figure 9B:
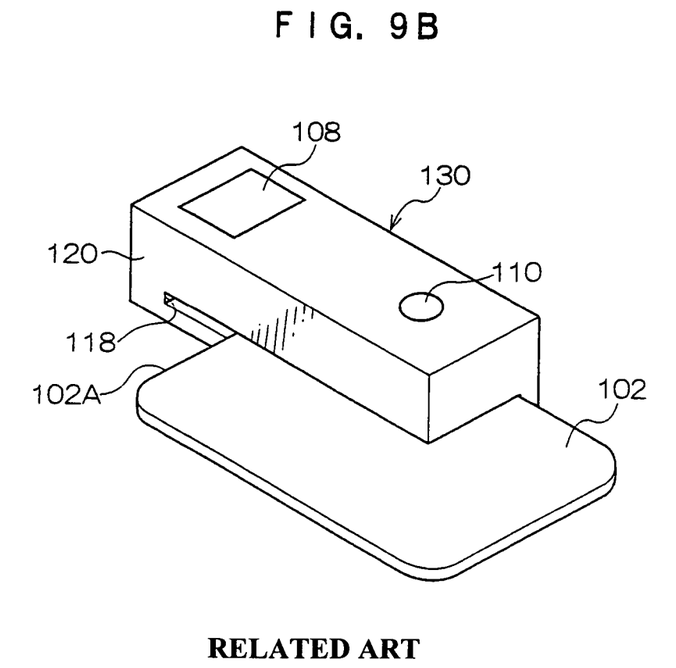

Thus, as shown in FIG. 9(B), Patent Document 1 also discloses a configuration where an abutment portion 118 that regulates the position of the hologram 104 is formed in a housing 120 of a reading device 130 at a position where the information of the hologram 104 is readable from the card 102, so that an end portion 102A of the card 102 abuts against the abutment portion 118 and the card 102 is positioned with respect to the reading device 130. However, it is necessary to dispose the hologram 104 in the card 102 at a position where the reference beam from the light source 106 is made incident when the end portion 102A of the card 102 abuts against the abutment portion 118. Namely, the region where the hologram 104 is formed (region where information is recorded) must be a determined position (same position from the end portion of the card 102) with respect to the abutment portion 118.

There is technology where an optical recording medium is formed, and various information is recorded in this optical recording medium with a hologram. As an example of the application of this technology, an optical recording medium is formed on paper printed with a printer, and information such as identification information and printing information is recorded in the optical recording medium by a hologram. A wide range of applications other than this is conceivable. Additionally, by using a reading device to read the information recorded by the hologram, the recorded information can be utilized.

However, in this case, the hologram is not limited to being formed always at a determined position with respect to the paper, and it is necessary to adjust the reading device to a readable position with respect to the hologram. As in Patent Document 1, when the hologram is formed at a constant determined position, the alignment between the reading device and the hologram can be easily adjusted by disposing an abutment portion such as shown in FIG. 9(B) in the reading device, but when the hologram is not formed at a determined position, it is difficult to align the position of the reading device with respect to the hologram. Also, the hologram can be reconstructed when reference beam is made incident from the same emission angle and emission direction as those at the time of recording, but when the hologram is formed on paper, there are instances where the angle at which the reference beam emitted from the light source of the reading device is made incident at the hologram does not match the condition for reconstructing the hologram due to the paper curling or to wrinkles, warps, rolls and rises in the paper, and in this case, the hologram is not reconstructed.

SUMMARY OF THE INVENTION

In consideration of the above-described facts, the present invention provides an optical information reading device where alignment of the reading device with the hologram can be done easily when the reading device reads information recorded by the hologram and which corrects curls and wrinkles in paper and can effectively read information in a case where the hologram is formed on paper.

An optical information reading device of a first aspect of the invention includes: a light source that irradiates, with reference beam, a hologram recorded in an optical recording medium; a reading unit that reads information from a holographic image reconstructed by the reference beam being diffracted by the hologram; a housing; a contact member that is disposed in the housing and contacts a paper on which the optical recording medium is formed; an open portion that is formed in the contact member, through which the optical recording medium is exposed, and towards which the reference beam is emitted; an alignment mark that is formed at a periphery of the open portion, the reference beam irradiating the hologram satisfying a holographic image reconstruction condition by the alignment mark being aligned with an optical recording medium alignment mark recorded on the optical recording medium; and a viewing portion that is positioned in the housing and through which the alignment mark and the optical recording medium alignment mark are visible.

In the optical information reading device of this aspect of the invention, the paper is contacted and pressed by the contact member disposed at the housing, the recording medium is exposed through the open portion, and the user views the inside of the housing through the viewing portion to align the optical recording medium alignment mark with the alignment mark, whereby reference beam satisfying the hologram reconstruction condition is emitted towards the open portion and information is read from the holographic image reconstructed by the reference beam being diffracted by the hologram.

In this manner, when the optical information reading device reads the information of the hologram recorded in the optical recording medium disposed on the paper, the paper is contacted and pressed by the contact member disposed at the housing, whereby the contact member contacts the paper and curls, wrinkles, warps, rolls and rises in the paper are corrected. Thus, because the optical recording medium is irradiated with reference beam satisfying the reconstruction condition of the hologram, the reference beam is diffracted by the hologram recorded in the optical recording medium and the holographic image thereof is accurately read by the reading unit.

In this manner, because the optical information reading device can accurately read the information of the hologram without increasing the number of parts, an optical information reading device whose structure is simple and which can be manufactured at a low cost is obtained.

Also, by rotating the contact member to align (match) the alignment mark formed at the periphery of the open portion with the optical recording medium alignment mark recorded on the optical recording medium, the incident direction of the reference beam becomes the hologram reconstruction condition. Thus, by aligning the optical information reading device and the optical recording medium with the alignment mark and the optical recording medium alignment mark, the hologram can be easily reconstructed, no matter at which position on the paper the optical recording medium, on which the hologram is recorded, is disposed.

An optical information reading device of a second aspect of the invention includes: a light source that irradiates, with reference beam, a hologram recorded in an optical recording medium; a reading unit that reads information from a holographic image reconstructed by the reference beam being diffracted by the hologram; a housing; a contact member that is disposed in the housing and contacts a paper on which the optical recording medium is formed; an open portion that is formed in the contact member, through which the optical recording medium is exposed, and towards which the reference beam is emitted; a viewing portion that is positioned in the housing and through which interior of the housing is visible; and an alignment mark that is formed at the viewing portion, the reference beam irradiating the hologram satisfying a holographic image reconstruction condition by the alignment mark being aligned with an optical recording medium alignment mark recorded on the optical recording medium.

An optical information reading device of a third aspect of the invention includes: at least two light sources that irradiate, with reference beam, a hologram recorded in an optical recording medium; a reading unit that reads information from a holographic image reconstructed by the reference beam being diffracted by the hologram; a housing; a contact member that is disposed in the housing and contacts a paper on which the optical recording medium is formed; an open portion that is formed in the contact member, through which the optical recording medium is exposed, and towards which the reference beam is emitted; and a viewing portion that is positioned in the housing and through which interior of the housing is visible, wherein the at least two light sources are disposed such that incident directions of the reference beams with respect to the open portion are different.

Because the aspects of the optical information reading device of the present invention have the above-described configurations, the reading device can be easily aligned with the hologram when the optical information reading device reads the information recorded by the hologram, and curls and wrinkles in the paper can be corrected when the hologram is formed on paper so that the information can be effectively read.

BRIEF DESCRIPTION OF THE DRAWINGS

Embodiments of the invention will be described in detail with reference to the following drawings, wherein.

DETAILED DESCRIPTION OF THE INVENTION

An optical information reading device 10 pertaining to a first embodiment of the invention will be described.

Figure 1:
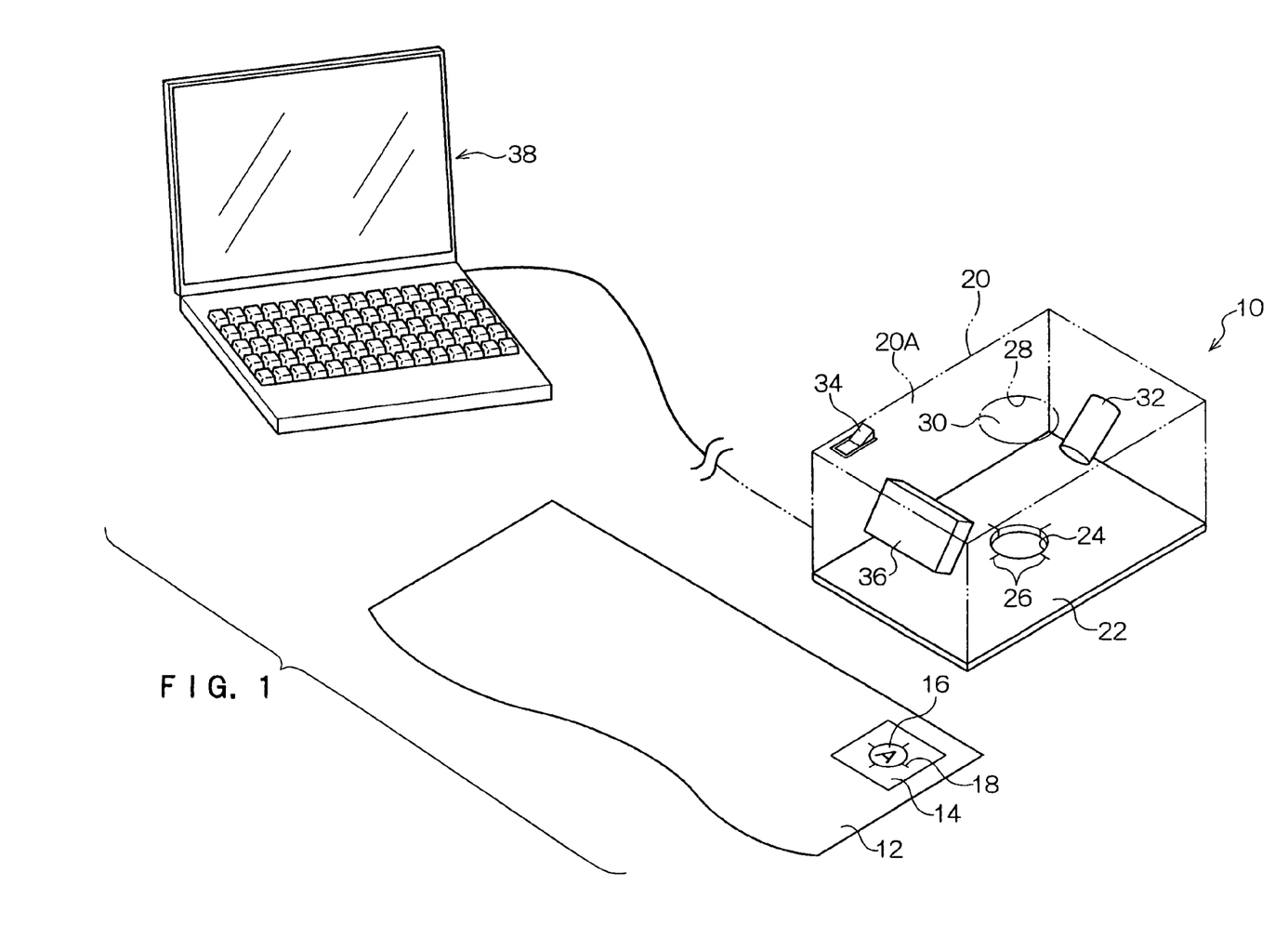
FIG. 1 is a perspective view showing an optical information reading device pertaining to a first embodiment of the invention.

As shown in FIG. 1, an optical recording medium 14 is formed on paper 12 so as to avoid a position at which information such as images and characters is formed, and information such as characters and images is recoded on the optical recording medium 14 by a hologram 16. A cross-shaped alignment mark 18 is formed at the periphery of the hologram 16.

Here, the optical information reading device 10, which reads the information of the hologram 16 recorded in the optical recording medium 14 formed on the paper 12, will be described.

The optical information reading device 10 is provided with a substantially rectangular, box-shaped housing 20. A planar bottom panel 22 is disposed at a lower side, at which an open portion 24 described later is formed, of the housing 20. The bottom panel 22 closely contacts the paper 12 and holds the paper 12 down when the optical information reading device 10 is placed on the paper 12.

Figure 2:
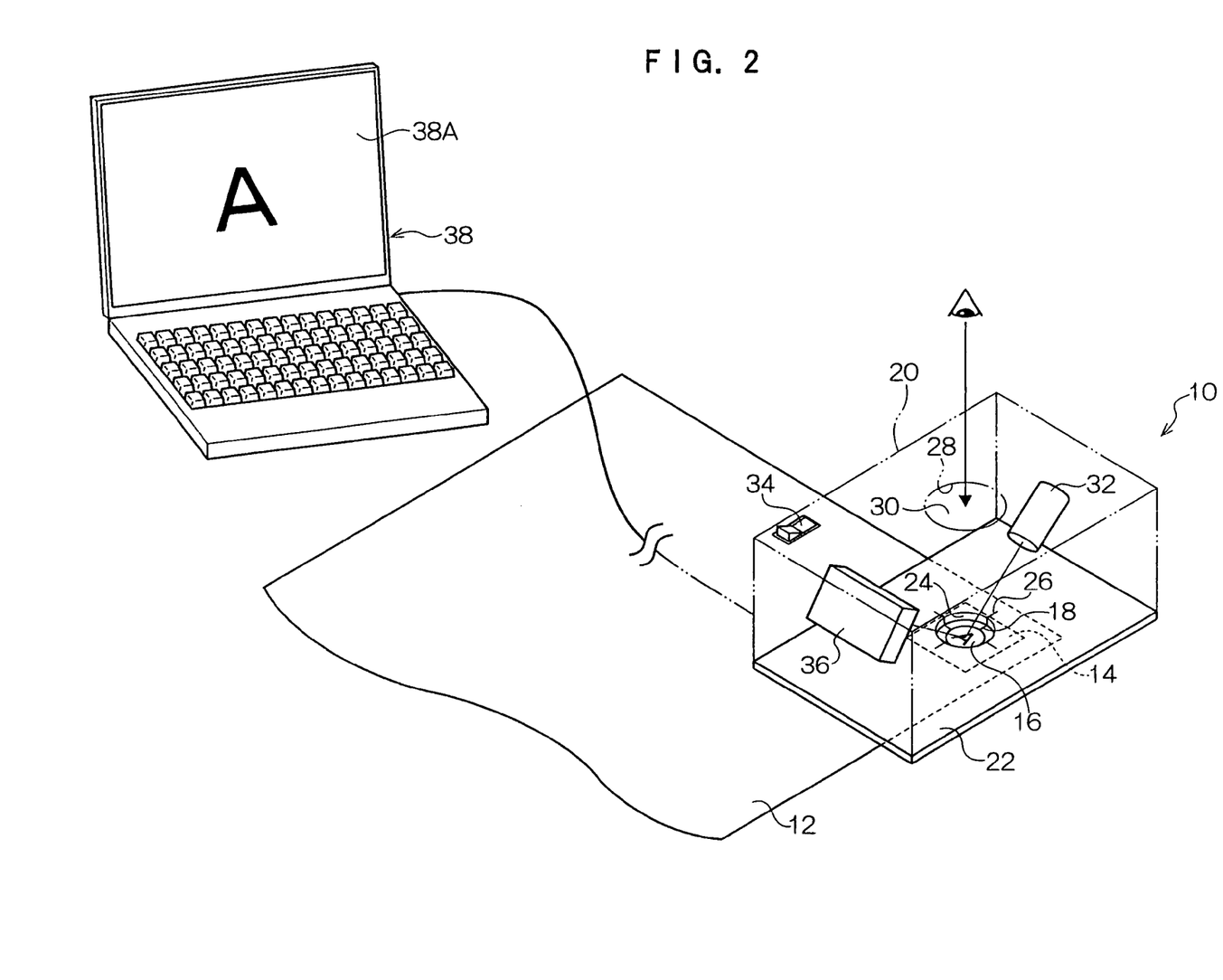
FIG. 2 is a perspective view showing a state where the optical information reading device pertaining to the first embodiment of the invention is placed on paper.

A circular open portion 24 is formed in a substantially central portion of the bottom panel 22. As shown in FIG. 2, when the optical information reading device 10 is placed on the paper 12, the optical recording medium 14 on the paper 12 is exposed through the open portion 24. It should be noted that it is not invariably necessary for the open portion 24 to be formed in the substantially central portion of the bottom panel 22 and may be formed at any position in the bottom panel 22. Also, the shape of the open portion 24 is not limited to a circle; the open portion 24 may be formed in any shape as long as it has a size where the optical recording medium 14 formed on the paper 12 can be exposed through the open portion 24. The shape of the optical recording medium 14 and the shape of the open portion 24 can be made to match each other.

A cross-shaped alignment mark 26 is formed at the periphery of the open portion 24. The optical information reading device 10 is placed on the paper 12 and the optical recording medium 14 formed on the paper 12 is exposed through the open portion 24. At this time, the alignment mark 26 is aligned with the alignment mark 18 recorded on the optical recording medium 14. Thus, the incident direction of the reference beam becomes the reconstruction condition of the hologram 16 recorded on the optical recording medium 14, so that when a light source 32 irradiates the optical recording medium 14 with the reference beam, the reference beam is diffracted by the hologram 16, becomes a holographic image and is made incident at a reading unit 36. In the present embodiment, the alignment marks are cross-shaped, but the alignment marks are not limited to this shape.

A circular window portion 28 is formed in an upper surface 20A of the housing 20. A transparent substrate 30 is fitted into this window portion 28, so that the inside of the housing 20 is visible through the transparent substrate 30. When the bottom panel 22 is placed on the paper 12 and the optical recording medium 14 on the paper 12 is exposed through the open portion 24, the user observes the inside of the housing 20 through the window portion 28 to visually align the alignment mark 18 of the optical recording medium 14 with the alignment mark 26 of the open portion 24. It should be noted that it is not invariably necessary to dispose the transparent substrate 30 in the window portion 28. However, by sealing the window portion 28 with the transparent substrate 30, the inside of the housing 20 can be closely closed off, and dust can be prevented from entering the housing 20 in this structure.

In the present embodiment, the window portion 28 is formed in the upper surface 20A of the housing 20, but the window portion 28 may also be formed in a side wall of the housing 20 as long as the inside of the housing 20 is visible. The shape of the window portion 28 is also not limited to a circle. Moreover, because the inside of the housing 20 can be made visible by forming the entire housing 20 with a transparent member, it is not necessary to form a window portion in the housing 20.

The light source 32 that emits the reference beam towards the open portion 24 is disposed inside the housing 20. The light source 32 is disposed at a diagonal with respect to the housing 20 so that it emits the reference beam at a predetermined angle with respect to the open portion 24.

A switch 34 is disposed in the upper surface 20A of the housing 20. The switch 34 is connected to the light source 32. When the switch 34 is switched ON, the reference beam is emitted from the light source 32. It should be noted that the place at which the switch 34 is disposed is not limited to the upper surface 20A of the housing 20; the switch 34 may also be disposed in a side surface of the housing 20.

The reading unit 36, having a CCD imaging element, is disposed inside the housing 20. The reading unit 36 is disposed at a position where the holographic image is made incident when the reference beam emitted from the light source 32 is diffracted by the hologram 16 recorded in the optical recording medium 14 exposed through the open portion 24. With respect to the holographic image made incident at the reading unit 36, an optical signal is converted into a digital signal by the reading unit 36. Additionally, the information recorded by the hologram 16 is displayed on a screen 38A of a personal computer 38 connected to the housing 20. In FIG. 2, the information is displayed inside the hologram 16 (here, an "A"), but this information cannot actually be seen because it is recorded by the hologram.

Next, the operation pertaining to the first embodiment of the invention will be described.

As shown in FIG. 2, the optical information reading device 10 is placed on the paper 12 so that the optical recording medium 14 on the paper 12 is exposed through the open portion 24, and the bottom panel 22 of the housing 20 of the optical information reading device 10 closely contacts the paper 12. The user views the inside of the housing 20 through the window portion 28 and rotates the optical information reading device 10 so that the alignment mark 26 formed at the open portion 24 is aligned with the alignment mark 18 recorded on the optical recording medium 14.

After the positions of the alignment mark 26 and the alignment mark 18 have been aligned, the switch 34 is switched ON and the light source 32 emits the reference beam towards the open portion 24. The optical recording medium 14 on the paper 12 is exposed through the open portion 24, and the optical recording medium 14 is irradiated with the reference beam. The reference beam is diffracted by the hologram 16 recorded in the optical recording medium 14, and the holographic image is made incident at the reading unit 36. The optical signal is converted to a digital signal by the reading unit 36, and the information of the hologram 16 is displayed on the screen 38A of the personal computer 38 connected to the optical information reading device 10.

In this manner, the bottom panel 22 of the housing 20 closely contacts the paper 12 when the optical information reading device 10 reads the information of the hologram 16 recorded in the optical recording medium 14 formed on the paper 12, whereby curls, wrinkles, bends, rolls and rises in the paper 12 are corrected. Thus, the optical recording medium 14 exposed through the open portion 24 is irradiated with reference beam satisfying the reconstruction condition of the hologram 16 recorded in the optical recording medium 14, and the information of the hologram 16 is reconstructed.

Also, because the information of the hologram 16 can be accurately reconstructed without increasing the number of parts, an optical information reading device 10 whose structure is simple and which can be manufactured at a low cost is obtained.

Moreover, the incident direction of the reference beam becomes the hologram reconstruction condition by aligning the alignment mark 26 formed at the periphery of the open portion 24 with the alignment mark 18 recorded on the optical recording medium 14. Thus, the hologram 16 can be easily reconstructed no matter at which position on the paper 12 the optical recording medium 14, in which the hologram 16 is recorded, is disposed.

Next, an optical information reading device 40 pertaining to a second embodiment of the invention will be described. Description of parts that are the same as those of the first embodiment will be omitted.

Figure 3A:
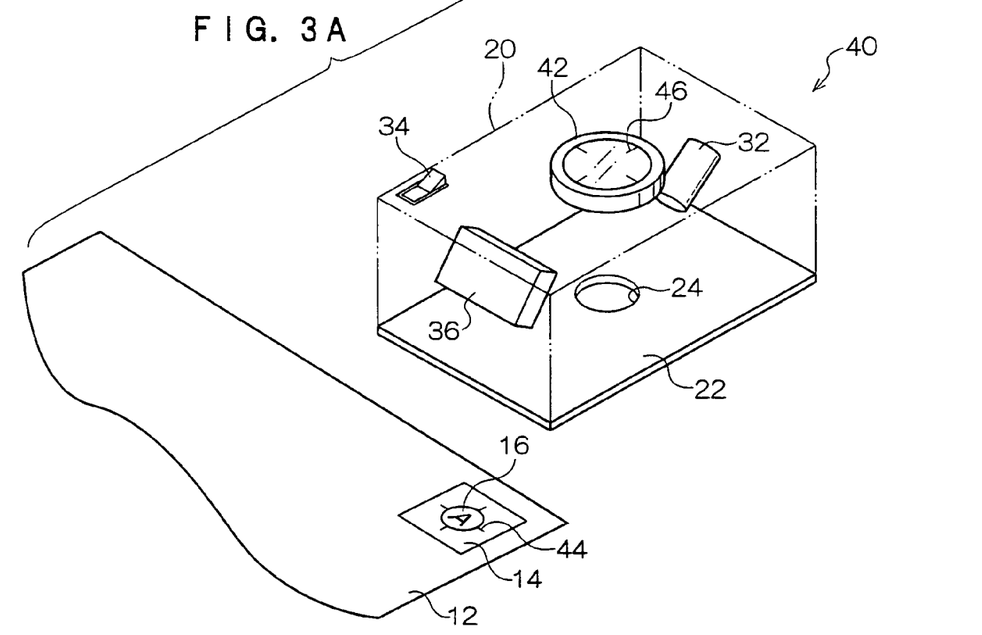
FIG. 3(A) is a perspective view showing an optical information reading device pertaining to a second embodiment of the invention.
Figure 3B:
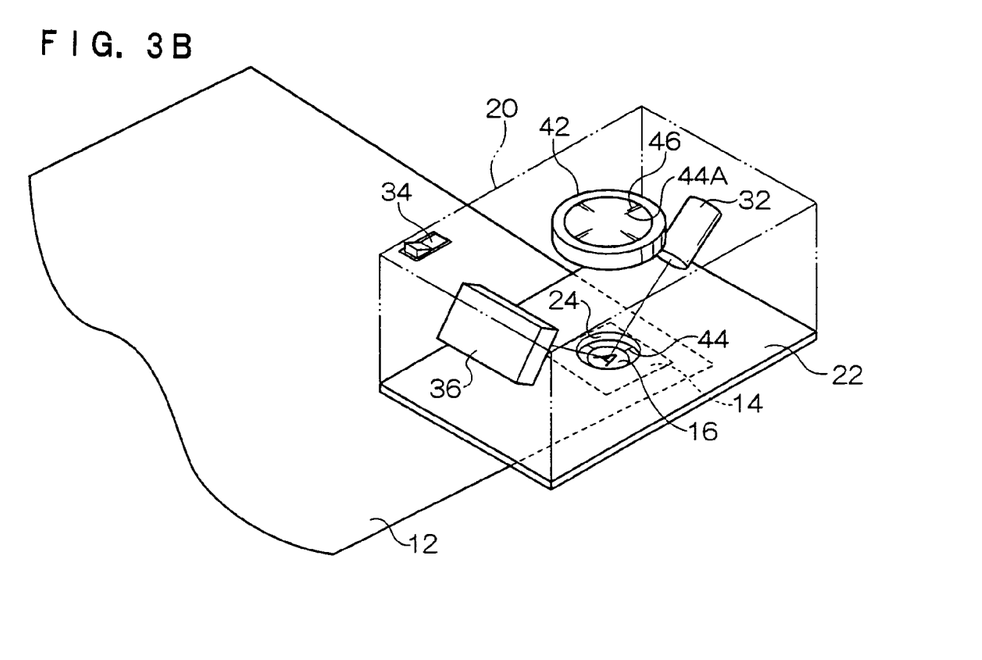
FIG. 3(B) is a perspective view showing a state where the optical information reading device pertaining to the second embodiment of the invention is placed on paper.

As shown in FIG. 3(A), a cross-shaped alignment mark 46 is formed at a window portion 42. Also, a cross-shaped optical recording medium alignment mark 44 is recorded by a hologram in the optical recording medium 14 on the paper 12. The optical recording medium 14 is irradiated with the reference beam from the light source 32, and the optical information reading device 40 is rotated and moved so that the respective alignment marks 44 and 46 are aligned with each other. When the incident direction of the reference beam matches the incident direction satisfying the hologram reconstruction condition, a holographic image 44A of the optical recording medium alignment mark 44 diffracted by the hologram is made incident at the window portion 42 and, as shown in FIG. 3(B), the cross-shaped holographic image 44A is displayed in the window portion 42. Thus, the incident direction of the reference beam becomes the reconstruction condition of the holographic image, so that when the optical recording medium 14 is irradiated with the reference beam from the light source 32, the holographic image that is reconstructed by the reference beam being diffracted by the hologram 16 recorded as information is made incident at the reading unit 36. In the present embodiment, the optical recording medium alignment mark is cross-shaped, but the optical recording medium alignment mark is not limited to this shape and may have any shape as long as the optical recording medium 14 can be positioned with respect to the light source 32.

In the present embodiment, the optical information reading device 40 is rotated and moved with respect to the paper 12 at the time of alignment, but the optical information reading device 40 may be fixed so that the paper 12 is rotated and moved.

Also, in FIGS. 3(A) and 3(B), the optical recording medium alignment mark 44 and the information "A" in the hologram 16 are displayed, but these are not actually visible because the optical recording medium alignment mark 44 and the information are recorded by the hologram.

Next, the action pertaining to the second embodiment of the invention will be described.

As shown in FIG. 3(B), the optical information reading device 40 is placed on the paper 12 so that the optical recording medium 14 on the paper 12 is exposed through the open portion 24, and the bottom panel 22 of the housing 20 of the optical information reading device 40 closely contacts the paper 12. Then, the switch 34 is switched ON and the light source 32 emits the reference beam towards the open portion 24. At this time, the holographic image 44A of the optical recording medium alignment mark 44 recorded in the optical recording medium 14 is displayed in the window portion 42, and when the alignment mark 46 formed at the window portion 42 is aligned with the displayed alignment mark (the holographic image 44A), the reference beam matches the reconstruction condition of the hologram 16 recorded in the optical recording medium 14, and the holographic image is reconstructed by the reference beam being diffracted by the hologram 16. The holographic image is made incident at the reading unit 36, the optical signal is converted to a digital signal by the reading unit 36, and the information of the hologram 16 is displayed on the screen 38A of the personal computer 38 (see FIG. 1) connected to the optical information reading device 40.

Next, an optical information reading device 50 pertaining to a third embodiment of the invention will be described. Description of parts that are the same as those of the first embodiment will be omitted.

Figure 4A:
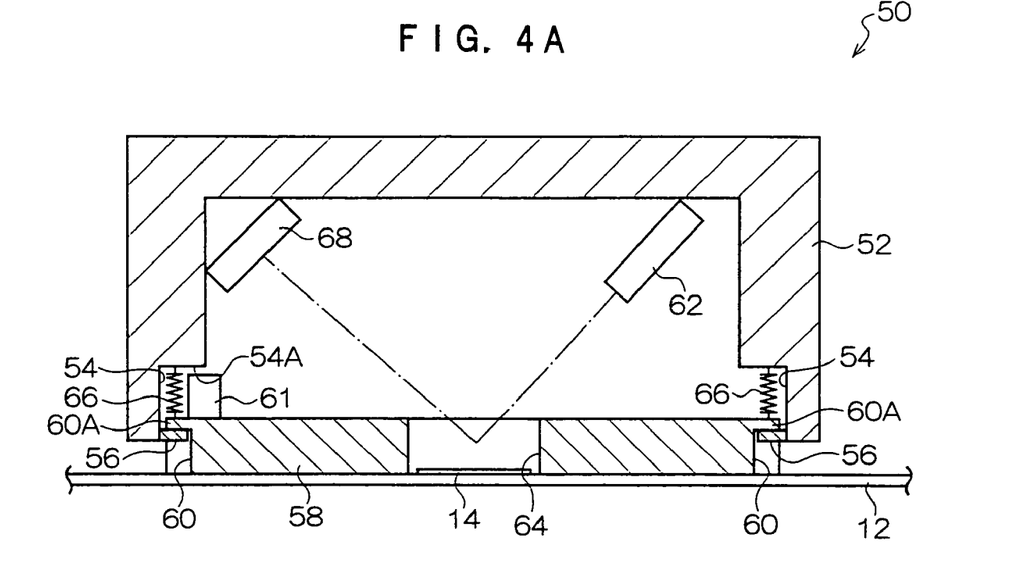
FIG. 4(A) is a cross-sectional view showing an optical information reading device pertaining to a third embodiment of the invention.

As shown in FIG. 4(A), the optical information reading device 50 is provided with a substantially rectangular, box-shaped housing 52. Stepped walls 54 are formed in side walls at the lower side of the housing 52, and engaging members 56 are disposed at end portions of the stepped walls 54.

A planar press-contact member 58, at which an open portion described later is formed, is disposed at the lower side of the housing 52. The press-contact member 58 is structured by a stepped portion 60 are wall portions 60A, thereby steps are formed at lower ends of the press-contact member 58. The wall portions engage with the engaging members 56. Moreover, unillustrated guide members are disposed in the vertical direction, so that the housing 52 is slidable in directions towards and away from the press-contact member 58. The press-contact member 58 is lifted upwards due to the wall portions 60A engaging with the engaging members 56.

Figure 4B:
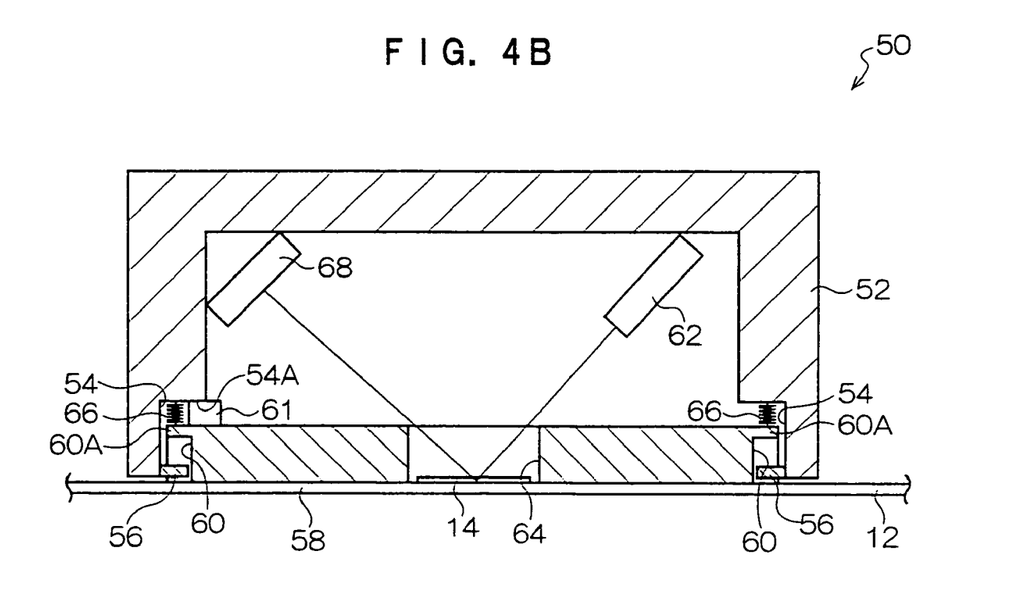
FIG. 4(B) is a cross-sectional view showing a state where the optical information reading device pertaining to the third embodiment of the invention is placed on paper.

A switch 61 that switches a later-described light source 62 ON and OFF is disposed at an end portion of an upper surface of the press-contact member 58. When the wall portions 60A of the press-contact member 58 are engaged with the engaging members 56 of the housing 52, the switch 61 is positioned between stepped wall surfaces 54A of the stepped walls 54 of the housing 52 and the end portions of the upper surface of the press-contact member 58. Additionally, as shown in FIG. 4(B), when the housing 52 is slid in the direction towards the paper 12 and pushed against the paper 12, the switch 61 is pushed by the stepped wall surface 54A. When the switch 61 is pushed, the light source 62 is switched ON, and the reference beam is emitted from the light source 62 towards an open portion 64. Moreover, when the pushed state of the switch 61 is released, the light source 62 is switched OFF.

Coil springs 66 are attached to the stepped wall surfaces 54A and the end portions of the upper surface of the press-contact member 58. The housing 52 is urged by the springs 66 in the direction moving away from the press-contact member 58.

The circular open portion 64 is formed in a substantially central portion of the press-contact member 58, so that when the optical information reading device 50 is placed on the paper 12, the optical recording medium 14 formed on the paper 12 is exposed through the open portion 64.

The light source 62, which emits the reference beam towards the open portion 64, and a reading unit 68, to which the reference beam, which is emitted towards the open portion 64 from the light source, diffracted by the hologram of the optical recording medium 14 on the paper 12 exposed through the open portion 64, is made incident, are attached to the housing 52. When the housing 52 is slid in the direction towards the paper 12, the light source 62 and the reading unit 68 are also moved in the direction in which they approach the paper 12. Additionally, when the housing 52 is slid in the direction towards the paper 12 until the switch 61 is switched ON, the light source 62 and the reading unit 68 and the open portion 64 are positioned, and the reference beam is emitted from the light source 62 towards the open portion 64.

Next, the action of the third embodiment of the invention will be described.

As shown in FIG. 4(B), when the housing 52 is slid towards the paper 12, the light source 62 is switched ON by the switch 61 disposed at the press-contact member 58. Thus, it becomes easy to switch the switch 61 ON and OFF.

Next, an optical information reading device 70 pertaining to a fourth embodiment of the invention will be described. Description of parts that are the same as those of the first embodiment and the third embodiment will be omitted.

Figure 5A:
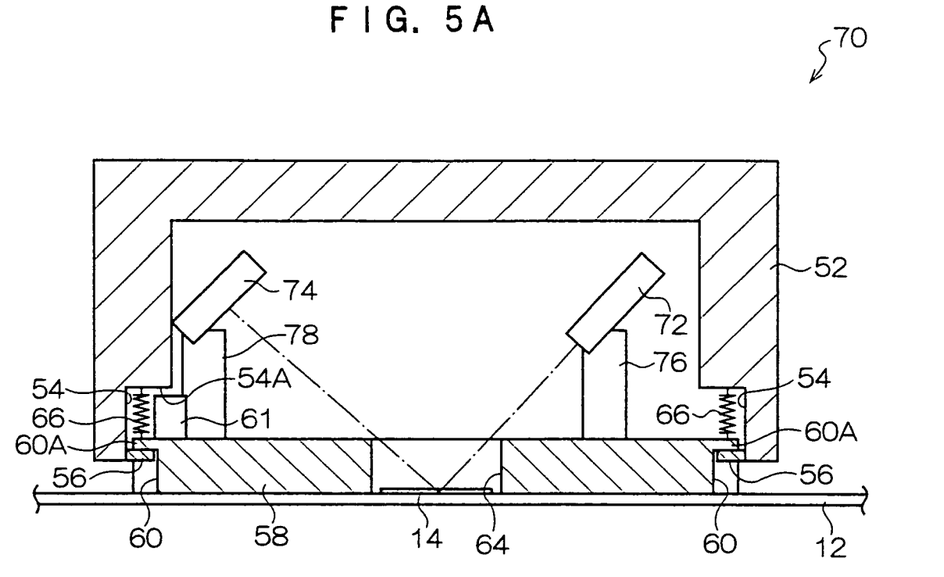
FIG. 5(A) is a cross-sectional view showing an optical information reading device pertaining to a fourth embodiment of the invention.
Figure 5B:
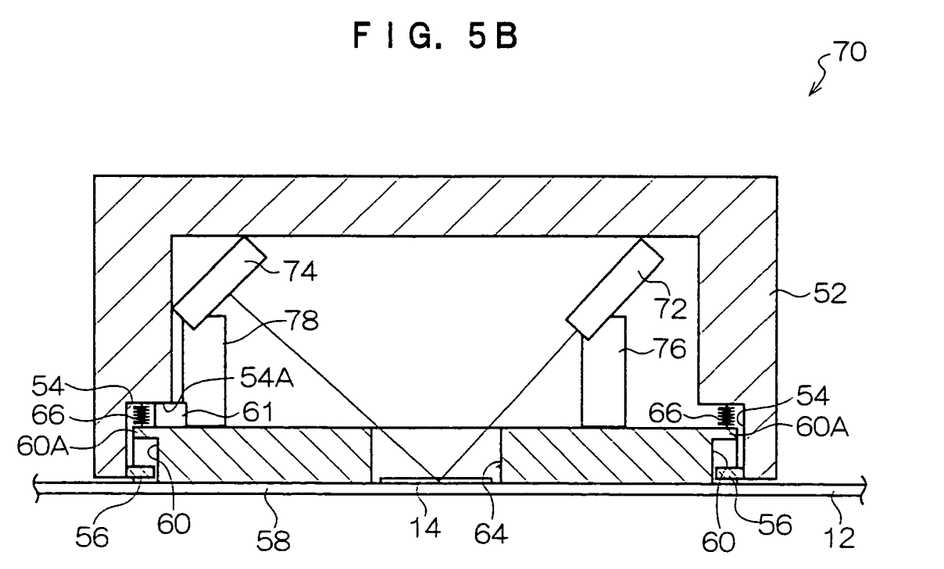
FIG. 5(B) is a cross-sectional view showing a state where the optical information reading device pertaining to the fourth embodiment of the invention is placed on paper.

As shown in FIG. 5(A), a light source 72 and a reading unit 74 are respectively attached to support members 76 and 78 disposed on the press-contact member 58. Thus, as shown in FIG. 5(B), the light source 72 and the reading unit 74 do not move and always remain in the same positions even when the housing 52 is slid with respect to the press-contact member 58. Additionally, when the switch 61 is pushed by the stepped wall surface 54A by the same configuration as that in the third embodiment, the reference beam is emitted from the light source 72 towards the open portion 64.

Next, the action of the fourth embodiment of the invention will be described.

As shown in FIG. 5(B), by disposing the light source 72 and the reading unit 74 on the press-contact member 58, positions of the light source 72 and the reading unit 74 are not shifted with respect to the open portion 64 even when the housing 52 is slid with respect to the press-contact member 58. Thus, reference beam satisfying the condition for reconstructing the hologram is emitted from the light source 72 towards the optical recording medium 14 exposed through the open portion 64.

Next, an optical information reading device 80 pertaining to a fifth embodiment of the invention will be described. Description of parts that are the same as those of the first embodiment will be omitted.

Figure 6A:
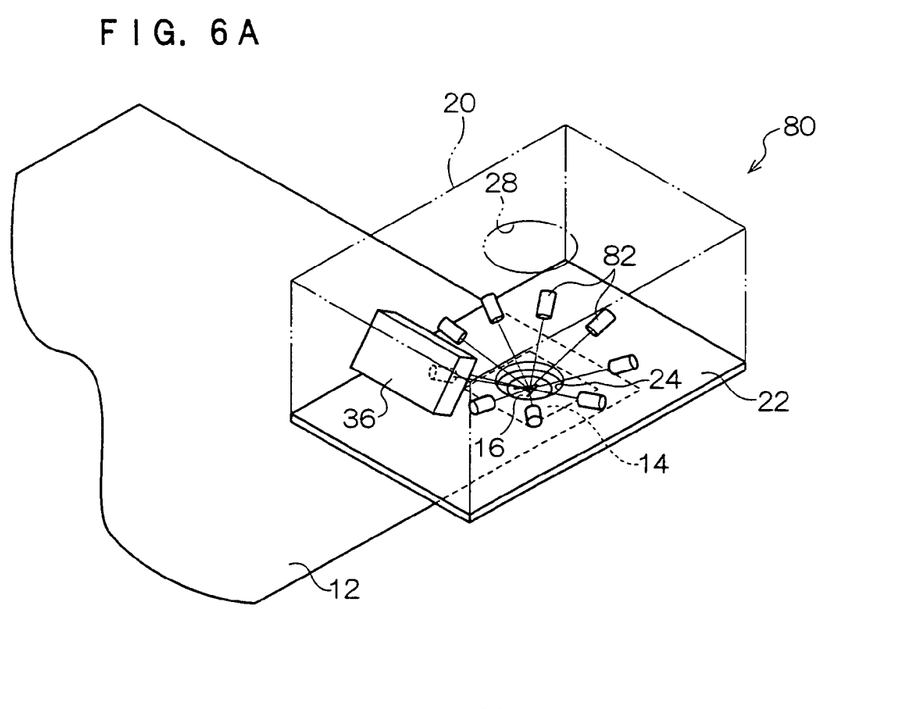
FIG. 6(A) is a perspective view showing an optical information reading device pertaining to a fifth embodiment of the invention.
Figure 6B:
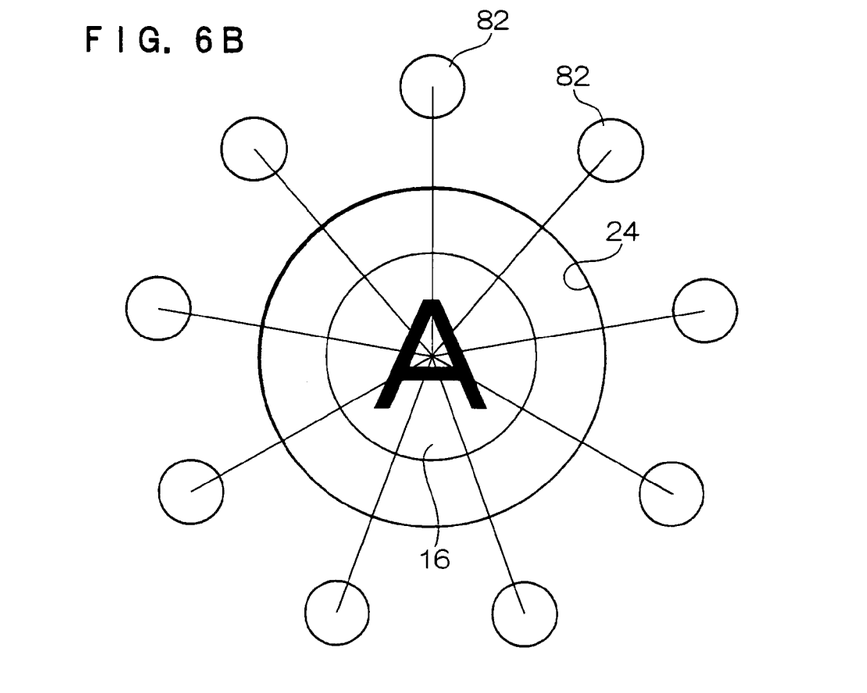
FIG. 6(B) is a front view.

As shown in FIG. 6(B), nine light sources 82 are disposed in the housing 20 at 40° intervals on a same circle around the open portion 24. Namely, the light sources 82 are disposed at positions where they are not mutually symmetrical with respect to the horizontal plane intersecting the center line of the open portion 24. Additionally, the reference beam is emitted from the respective light sources 82 in different directions towards the open portion 24. In FIG. 6(B), information "A" is displayed in the hologram 16, but this information is not actually visible because it is recorded by the hologram.

Next, the action of the fifth embodiment of the invention will be described.

There are holograms that are multiply recorded by rotating the emission direction of the reference beam at the time of recording. Multiply recorded holograms can be smoothly aligned in the rotation direction. However, because the recording conditions in multiple recording are complex and multiple recording is cumbersome, from a practical standpoint, holograms that are not multiply recorded are often used. A hologram that is not multiply recorded is reconstructed by irradiating with plural reference beams from different emission directions.

As shown in FIG. 6(A), by simultaneously emitting the reference beams from the plural light sources 82 (nine in the present embodiment) towards the open portion 24, any of the reference beams emitted from the nine light sources 82 matches the reconstruction condition of the hologram and the hologram is reconstructed simply by exposing the optical recording medium 14 through the open portion 24, even if the optical recording medium 14 is not aligned in the rotation direction.

Figure 7A:
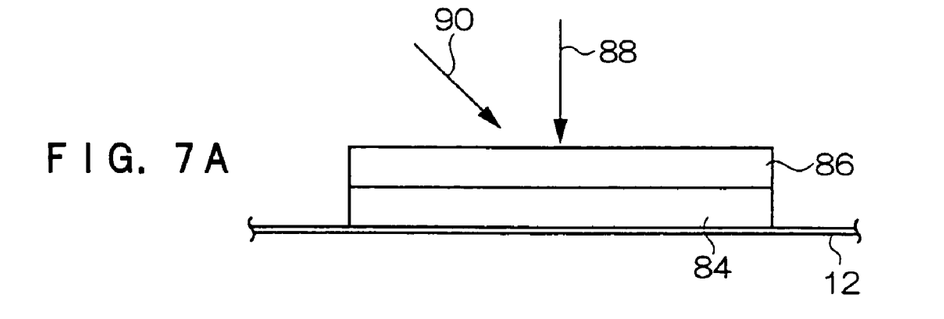
FIGS. 7(A) to 7(D) are explanatory views in a case where a reflective layer and a recording medium are formed on paper and a transmission hologram is recorded.

Also, as shown in FIG. 7(A), there are instances where a reflective layer 84 is disposed in advance on the paper 12, an optical recording medium 86 is formed on the reflective layer 84, and the optical recording medium 86 is irradiated with signal beam 88 and reference beam 90 to record a transmission hologram on the optical recording medium 86.

Figure 7B:
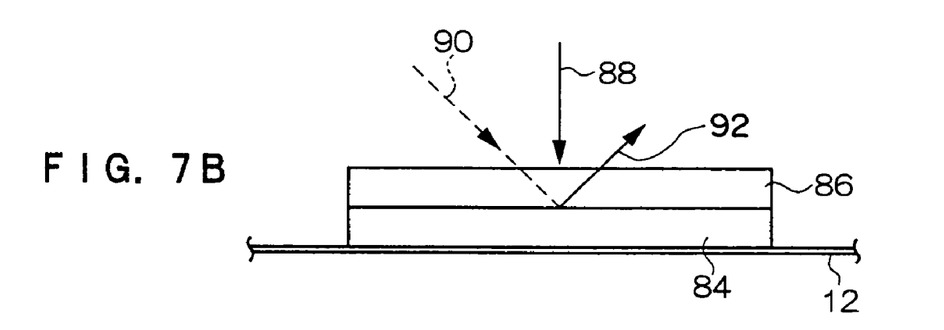
Figure 7C:
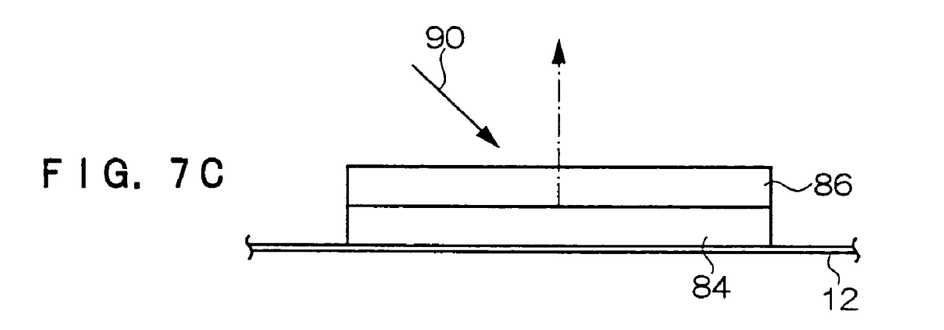
Figure 7D:
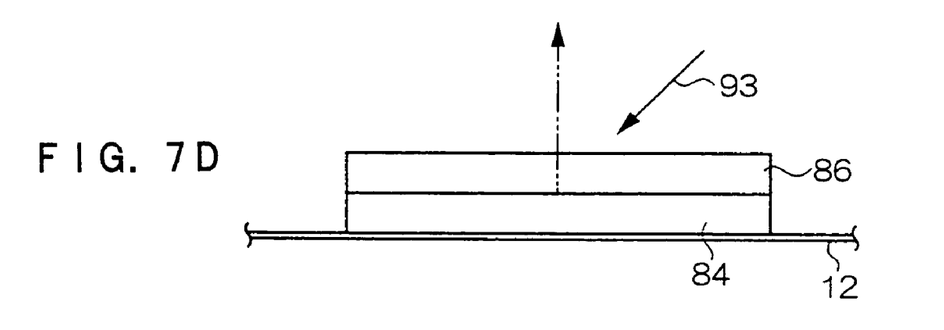

However, when the reflective layer 84 is used in this manner, the reference beam 90 emitted at the time the transmission hologram is recorded is reflected by the reflective layer 84 and reflected light 92 arises, as shown in FIG. 7(B). Additionally, a reflection hologram ends up being recorded in the optical recording medium 86 by the reflected light 92 and the signal beam 88. In other words, in a case where the reflective layer 84 is disposed on the paper 12 and a transmission hologram is recorded in the optical recording medium 86 formed on the reflective layer 82, a transmission hologram and a reflection hologram end up being simultaneously recorded. Additionally, as shown in FIG. 7(C), when the hologram where the transmission hologram and the reflection hologram are recorded is irradiated with the reference beam 90 from the same emission direction as when the transmission hologram was recorded, the transmission hologram is reconstructed (indicated by the single-dot chain line). However, as shown in FIG. 7(D), when reference beam 93 is made incident from the direction symmetrical to the reference beam 90 (see FIG. 7(C)) around the hologram, the reflection hologram ends up being reconstructed (indicated by the two-dot chain line). The reconstructed image of the reflection hologram becomes noise, which causes the reconstructed image of the transmission hologram to deteriorate.

Thus, in the present embodiment, as shown in FIG. 6(B), the nine light sources 82 are disposed at 40° intervals so that each light source 82 is disposed in a position different from the traveling directions of the reflected lights, which are emitted from the other light sources 82, reflected by the reflective layer 84 (see FIGS. 7(A) to 7(D)). Thus, because there is no light source that emits reference beam reconstructing the reflection hologram as in FIG. 7(D), the reflection hologram that is a noise source is not reconstructed and there is no potential for noise to arise.

In the present embodiment, nine light sources were disposed at 40° intervals, but any number of light sources 82 may be used as long as each light source 82 is disposed in a position different from the traveling directions of the reflected lights, which are emitted from the other light sources 82, reflected by the reflective layer 84. Also, in this case, the intervals between the light sources 82 do not have to be equidistant.

Figure 8:
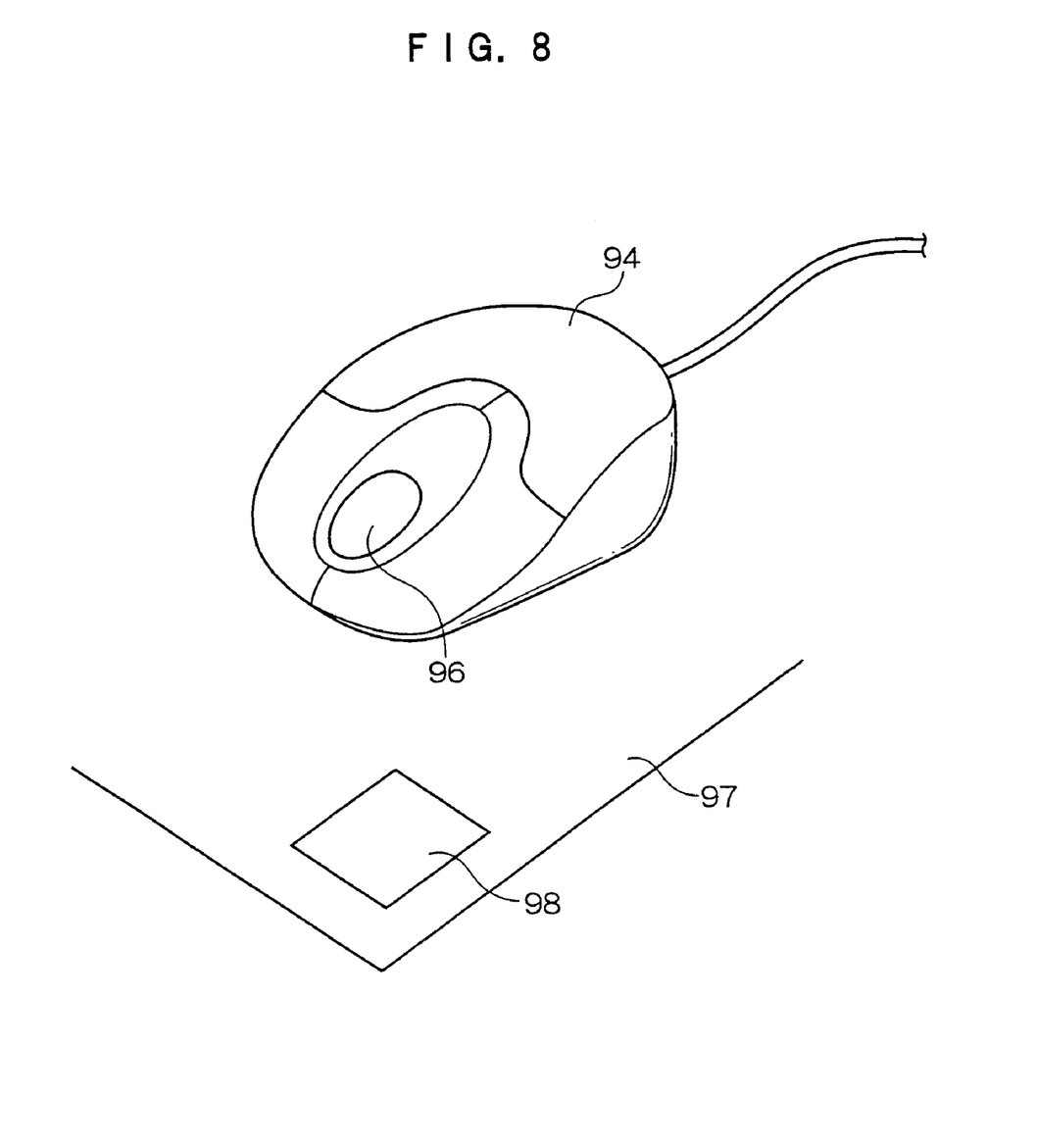
FIG. 8 is a perspective view showing another embodiment with respect to the optical information reading device pertaining to the first embodiment of the invention.

Moreover, as shown in FIG. 8, the invention may be configured so that a window portion 96 is formed in a mouse-shaped housing 94, the user observes the inside of the housing 94 through the window portion 96 and aligns an unillustrated open portion formed in a bottom portion of the housing 94 with an optical recording medium 98 recorded on paper 97, and the optical recording medium 98 is irradiated with reference beam from a light source disposed inside the housing 94, so that information of a hologram recorded in the optical recording medium 98 is read.

Note that, in the aspect of the present invention, a window portion, serving as the viewing portion, through which the alignment mark and the optical recording medium alignment mark are visible, can be disposed at the housing.

Further, in the aspect of the present invention, the housing can be formed by a transparent member.

By forming the housing with a transparent member, the inside of the housing can be observed without disposing the window portion in the housing. Thus, the alignment mark and the optical recording medium alignment mark can be visually aligned from the outside of the housing.

Further, in the aspect of the invention, it is possible that the optical recording medium alignment mark is a hologram, a holographic image of the optical recording medium alignment mark reconstructed by the reference beam being diffracted by the hologram of the optical recording medium alignment mark is displayed in the viewing portion, and an alignment portion which is aligned with the holographic image of the optical recording medium alignment mark is formed in the viewing portion.

By irradiating the optical recording medium alignment mark of the hologram with the reference beam, the holographic image diffracted by the optical recording medium alignment mark of the hologram is displayed in the viewing portion and is aligned with the alignment portion formed in the viewing portion, whereby the incident direction of the reference beam satisfies the hologram reconstruction condition.

Further, in the aspect of the invention, the housing can be vertically slidable with respect to the contact member, and the contact member or the housing can be disposed with a switch that switches the light source ON when the housing is lowered with respect to the contact member.

When the housing which is vertically slidable with respect to the contact member is slid towards the paper, for example, the switch disposed at the housing or the contact member is sandwiched between the housing and the contact member, and the light source is switched ON. Thus, the switch can be easily switched ON and OFF.

Further, in the aspect of the invention, the light source and the reading unit can be disposed on the contact member.

By disposing the light source and the reading unit on the contact member, the positions of the light source and the reading unit are not shifted with respect to the open portion even if the housing is slid with respect to the contact member. For this reason, it is not necessary to dispose the light source and the reading unit in consideration of the sliding amount of the housing, so that the assembly of the optical information reading device becomes easy.

Further, in the aspect of the invention, at least two light sources, where the incident directions of the reference beams with respect to the open portion are different, can be disposed.

At least two light sources, where the incident directions of the reference beams with respect to the open portion are different, are disposed, and the optical recording medium exposed through the open portion is irradiated with the reference beam from the respective light sources. Thus, any of the reference beams emitted from the plural light sources matches the reconstruction condition of the hologram and the hologram is reconstructed simply, by merely exposing the optical recording medium through the open portion, even if the optical recording medium is not aligned in the rotation direction.

Further, in the aspect of the invention, it is possible that each of the light sources is disposed at a position which is different from traveling directions of reflected lights, of the reference beams emitted from the other light sources, reflected by the hologram.

Each of the light sources is disposed at a position which is different from traveling directions of reflected lights, of the reference beams emitted from the other light sources, reflected by the hologram. Thus, because there are no light sources that emit reference beam reconstructing a reflection hologram, the reflection hologram that is a noise source is not reconstructed and there is no potential for noise to arise.

Further, in the aspect of the invention, the light source and the reading unit can be disposed on the housing.

Further, in the aspect of the invention, an urging member can be provided between the housing and the contact member.

What is claimed is:

1. An optical information reading device comprising:
   a light source that irradiates, as a reference beam, a hologram recorded in an optical recording medium;
   a reading unit that reads information from a holographic image reconstructed by the reference beam when diffracted by the hologram;
   a housing;
   a contact member that is disposed in the housing and contacts a paper on which the optical recording medium is formed;
   an open portion that is formed in the contact member, through which the optical recording medium is exposed, and towards which the reference beam is emitted;
   a first alignment mark formed at a periphery of the open portion, the first alignment mark having first mark portions that are formed by a plurality of mark portions;
   a matching unit that matches a second alignment mark, having second mark portions that are formed by a plurality of mark portions, at a periphery of the hologram on the optical recording medium with the first mark portions, wherein the second mark portions correspond to the first mark portions, and a holographic image reconstruction condition of the reference beam is satisfied when the second mark portions match the first mark portions; and
   a viewing portion that is positioned in the housing, the first alignment mark and the second alignment mark being visible through the viewing portion, wherein
   the housing is vertically slidable with respect to the contact member, and one of the contact member or the housing includes a switch that switches the light source ON when the housing is lowered with respect to the contact member, and
   when the housing is lowered with respect to the contact member, the housing and the contact member push against the paper.

2. The optical information reading device of claim 1, wherein a window portion, serving as the viewing portion, through which the first and second alignment marks are visible, is disposed at the housing.

3. The optical information reading device of claim 1, wherein the second mark portions are formed by holograms.

4. The optical information reading device of claim 1, wherein the light source and the reading unit are disposed on the contact member.

5. The optical information reading device of claim 1, wherein the housing is formed by a transparent member.

6. The optical information reading device of claim 1, wherein the light source and the reading unit are disposed on the housing.

7. The optical information reading device of claim 1, wherein an urging member is provided between the housing and the contact member.

8. An optical information reading device comprising:
   a light source that irradiates, as a reference beam, a hologram recorded in an optical recording medium;
   a reading unit that reads information from a holographic image reconstructed by the reference beam when diffracted by the hologram;
   a housing;
   a contact member that is disposed in the housing and contacts a paper on which the optical recording medium is formed;
   an open portion that is formed in the contact member, through which the optical recording medium is exposed, and towards which the reference beam is emitted;
   a viewing portion that is positioned in the housing and through which an interior of the housing is visible;
   a third alignment mark that is formed at the viewing portion, the third alignment mark having third mark portions that is formed by a plurality of mark portions; and
   a matching unit that matches a fourth alignment mark, having fourth mark portions that are formed by a plurality of mark portions, at a periphery of the hologram on the optical recording medium with the third mark portions, wherein the fourth mark portions correspond to the third mark portions, and a holographic image reconstruction condition of the reference beam is satisfied when fourth mark portions match the third mark portions, wherein the housing is vertically slidable with respect to the contact member, and one of the contact member or the housing includes a switch that switches the light source ON when the housing is lowered with respect to the contact member, and when the housing is lowered with respect to the contact member, the housing and the contact member push against the paper.

9. The optical information reading device of claim 8, wherein the fourth mark portions are formed as holograms, a holographic image of the fourth mark portions are formed by the reference beam when diffracted by the hologram of the fourth mark portions and displayed in the viewing portion, and the holographic image reconstruction condition is satisfied by the reference beam when matching the holographic image of the fourth mark portions with the third mark portions.

10. The optical information reading device of claim 8, wherein a window portion, serving as the viewing portion, is disposed at the housing.

11. The optical information reading device of claim 1, wherein the first mark portions constitute cross hairs and the second mark portions correspond to the cross hairs.

12. The optical information reading device of claim 8, wherein the third mark portions constitute cross hairs and the fourth mark portions correspond to the cross hairs.

13. The optical information reading device of claim 1, wherein the plurality of mark portions of the first alignment mark are formed at an outer side of an edge of the open portion.

14. The optical information reading device of claim 13, wherein the plurality of mark portions of the second alignment mark are formed at an outer side of the hologram on the optical recording medium.

* * * * *